(12) United States Patent
Raskin et al.

(10) Patent No.: US 9,384,150 B2
(45) Date of Patent: Jul. 5, 2016

(54) METHOD AND APPARATUS FOR PERFORMING TRANSPARENT MASS STORAGE BACKUPS AND SNAPSHOTS

(71) Applicant: JANUS TECHNOLOGIES, INC., Half Moon Bay, CA (US)

(72) Inventors: Sofin Raskin, Los Altos, CA (US); Michael Wang, Taipei (TW); Joshua Porten, Austin, TX (US); Alexander Rezinsky, Katzir (IL)

(73) Assignee: Janus Technologies, Inc., Half Moon Bay, CA (US)

( * ) Notice: Subject to any disclaimer, the term of this patent is extended or adjusted under 35 U.S.C. 154(b) by 279 days.

(21) Appl. No.: 13/971,651

(22) Filed: Aug. 20, 2013

(65) Prior Publication Data
US 2015/0058442 A1    Feb. 26, 2015

(51) Int. Cl.
G06F 15/16     (2006.01)
G06F 13/10     (2006.01)
G06F 11/14     (2006.01)

(52) U.S. Cl.
CPC ............... *G06F 13/10* (2013.01); *G06F 11/14* (2013.01); *G06F 11/1456* (2013.01); *G06F 11/1458* (2013.01); *G06F 2201/84* (2013.01)

(58) Field of Classification Search
CPC ................................. G06F 13/10; G06F 11/14
USPC ........................................................ 709/217
See application file for complete search history.

(56) References Cited

U.S. PATENT DOCUMENTS

| | | |
|---|---|---|
| 4,598,170 A | 7/1986 | Piosenka et al. |
| 5,191,542 A | 3/1993 | Murofushi |
| 5,724,027 A | 3/1998 | Shipman et al. |
| 5,946,469 A | 8/1999 | Chidester |
| 6,061,794 A | 5/2000 | Angelo et al. |
| 6,088,802 A | 7/2000 | Bialick et al. |
| 6,457,164 B1 | 9/2002 | Hwang et al. |
| 6,507,914 B1 | 1/2003 | Cain et al. |
| 6,546,491 B1 | 4/2003 | Challener et al. |

(Continued)

FOREIGN PATENT DOCUMENTS

| | | |
|---|---|---|
| EP | 2517144 | 7/2011 |
| EP | 2407905 | 1/2012 |

OTHER PUBLICATIONS

International Search Report dated Dec. 3, 2014 in corresponding PCT/US14/051705.

(Continued)

*Primary Examiner* — Ario Etienne
*Assistant Examiner* — Sahera Halim
(74) *Attorney, Agent, or Firm* — Foley & Lardner LLP; Mark J. Danielson (57) ABSTRACT

The present invention relates to providing security functionality over computer system mass storage data, and more particularly relates to a system and method of transparent data backup on either local or remote storage devices such as SATA storage devices. According to aspects of the invention, the system is transparent to operating system and application software layers. That makes it unnecessary to make any software modifications to the file system, device drivers, operating system, or applications, or installing specialized applications or hardware. In embodiments, the snapshot functionality of the invention is implemented entirely in hardware, and is not designed to slow down performance of the rest of the system.

38 Claims, 10 Drawing Sheets

(56) References Cited

U.S. PATENT DOCUMENTS

| | | |
|---|---|---|
| 6,594,780 B1 | 7/2003 | Shen et al. |
| 6,725,438 B2 | 4/2004 | Van Ginneken |
| 6,782,424 B2 | 8/2004 | Yodaiken |
| 6,820,160 B1 | 11/2004 | Allman |
| 6,922,817 B2 | 7/2005 | Bradfield et al. |
| 7,120,892 B1 | 10/2006 | Knol et al. |
| 7,149,992 B2 | 12/2006 | Chang et al. |
| 7,240,303 B1 | 7/2007 | Schubert |
| 7,320,071 B1 | 1/2008 | Friedman et al. |
| 7,330,891 B2 | 2/2008 | Yodaiken |
| 7,337,100 B1 | 2/2008 | Hutton et al. |
| 7,340,700 B2 | 3/2008 | Emerson |
| 7,350,204 B2 | 3/2008 | Lambert et al. |
| 7,396,257 B2 | 7/2008 | Takahashi |
| 7,469,343 B2 | 12/2008 | Ray et al. |
| 7,478,235 B2 | 1/2009 | England et al. |
| 7,516,217 B2 | 4/2009 | Yodaiken |
| 7,635,272 B2 | 12/2009 | Poppe |
| 7,677,065 B1 | 3/2010 | Miao |
| 7,962,755 B2 | 6/2011 | Pizano et al. |
| 7,987,497 B1 | 7/2011 | Giles et al. |
| 8,127,096 B1 | 2/2012 | Chaterlee et al. |
| 8,402,529 B1 | 3/2013 | Green et al. |
| 8,429,419 B2 | 4/2013 | Endrys |
| 8,566,934 B2 | 10/2013 | Srivastava |
| 8,606,971 B2 | 12/2013 | Cain et al. |
| 8,627,106 B2 | 1/2014 | Pizano et al. |
| 2002/0007456 A1 | 1/2002 | Peinado et al. |
| 2002/0069396 A1 | 6/2002 | Bhattacharya et al. |
| 2004/0199879 A1 | 10/2004 | Bradfield |
| 2005/0240892 A1 | 10/2005 | Broberg et al. |
| 2007/0067585 A1* | 3/2007 | Ueda et al. .................. 711/162 |
| 2007/0174569 A1* | 7/2007 | Schnapp et al. ............. 711/162 |
| 2007/0255963 A1 | 11/2007 | Pizano et al. |
| 2008/0091833 A1 | 4/2008 | Pizano et al. |
| 2008/0247540 A1 | 10/2008 | Ahn et al. |
| 2008/0263658 A1 | 10/2008 | Michael et al. |
| 2009/0006745 A1 | 1/2009 | Cavalo et al. |
| 2009/0013111 A1 | 1/2009 | Berland et al. |
| 2009/0033668 A1 | 2/2009 | Pederson et al. |
| 2009/0212844 A1 | 8/2009 | Darmawan et al. |
| 2010/0024004 A1 | 1/2010 | Boegelund et al. |
| 2010/0049929 A1 | 2/2010 | Nagarkar et al. |
| 2010/0192230 A1 | 7/2010 | Steeves et al. |
| 2010/0201400 A1 | 8/2010 | Nardone et al. |
| 2010/0306774 A1 | 12/2010 | Kalbarga |
| 2011/0078119 A1 | 3/2011 | Soran et al. |
| 2011/0102443 A1 | 5/2011 | Dror et al. |
| 2011/0131423 A1 | 6/2011 | Ponsini |
| 2011/0258460 A1 | 10/2011 | Pizano et al. |
| 2012/0017197 A1 | 1/2012 | Mehta et al. |
| 2012/0079221 A1* | 3/2012 | Sivasubramanian et al. . 711/162 |
| 2012/0166582 A1* | 6/2012 | Binder .......................... 709/217 |
| 2012/0192129 A1 | 7/2012 | Bowers |
| 2013/0067534 A1 | 3/2013 | Soffer |
| 2013/0212671 A1 | 8/2013 | Wang et al. |
| 2013/0238908 A1 | 9/2013 | Pizano |
| 2014/0149696 A1* | 5/2014 | Frenkel et al. ................ 711/162 |

OTHER PUBLICATIONS

Garfinkel, "Terra: A Virtual Machine-Based Platform for Trusted Computing", ACM SOSP. Proc. of the ACM Symp. on Operating system Printciples, Oct. 22, 2003, pp. 193-206.

Landau, et al., "SlitX: S;lit Guest/Hypervisor Execution on Multi-Core", 3$^{rd}$ Workshop of IO irtualization, Jun. 14, 2011, pp. 1-7.

International Preliminary Report on Patentability for International Patent Application No. PCT/U82014/051705, mailed on Mar. 3, 2016, 7 pages.

* cited by examiner

METHOD AND APPARATUS FOR PERFORMING TRANSPARENT MASS STORAGE BACKUPS AND SNAPSHOTS

FIELD OF THE INVENTION

The present invention relates generally to a system and method for storing computer system data, more particularly including performing transparent and/or automatic backups and snapshots of computer system mass storage devices such as SATA hard drives.

BACKGROUND OF THE INVENTION

Conventional computing devices typically include one to many conventional types of connectable external devices such as mice, keyboards, wireless modems, thumb drives, hard drives, etc., as well as internal devices such as hard drives and SSD drives.

However, the specifications for many of the interfaces for these devices such as Serial AT Attachment (SATA), have no provision for backing up data written to SATA devices. One way to increase reliability of the data is by running specialized software applications. One disadvantage of this approach is lack of interoperability between operating systems—each operating system and file system requires a different backup application. Another disadvantage is the requirement to have a separate storage device for backup. That complicates system configuration. Also, system administrators require maintaining separate configuration of each system due to differences in software and hardware. Example prior art approaches include EP Application Number EP2407905 and EP Application Number EP2517144.

Performance is another issue. Software-based backup systems greatly impact CPU performance and cause many users to turn the backup program off.

Meanwhile, there are a number of applications that would greatly benefit from efficient mass storage data backups, such as applications for storing sensitive data on SATA mass storage devices. Accordingly there remains a need for efficient techniques for performing backups of mass storage devices such as SATA storage devices.

SUMMARY OF THE INVENTION

The present invention relates to providing automated functionality over computer system mass storage data, and more particularly relates to a system and method of performing automated and/or transparent data backup on either local or remote storage devices such as SATA storage devices. According to aspects of the invention, the system is transparent to operating system and application software layers. That makes it unnecessary to make any software modifications to the file system, device drivers, operating system, or applications, or installing specialized applications or external hardware. In embodiments, the snapshot functionality of the invention is implemented mostly or entirely in hardware, and is designed to not slow down performance of the rest of the system.

In accordance with these and other aspects, a computer system according to embodiments of the invention includes a mass storage device, a host processor executing an operating system and applications that create and use data stored on the mass storage device, and a secure processor that manages space on the mass storage device for storing one or both of snapshots and backup copies of the data, wherein the secure processor operates independently from and transparently to the host processor, and wherein the host processor cannot independently access the space managed by the secure processor.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

According to general aspects, embodiments of the invention enable providing security functionality over otherwise unsecured SATA data and communications. According to one aspect, embodiments of the invention implement mass storage snapshots and/or backups. According to certain additional aspects, the security functions performed by embodiments of the invention can be logically transparent to the upstream host and to the downstream device.

Figure 1:
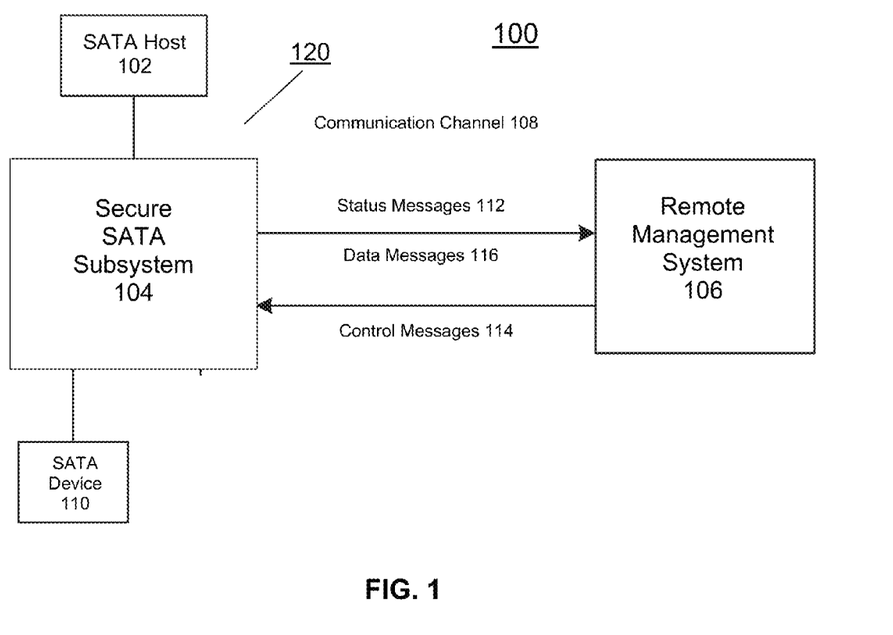
FIG. 1 is a block diagram illustrating an example subsystem for securing SATA data and communications according to embodiments of the invention.

FIG. 1 is a system level block diagram of a management system 100 according to embodiments of the invention. As shown, system 100 includes a managed secure computer 120 comprising a SATA host 102, Secure SATA Subsystem 104, and SATA device 110.

In one non-limiting example configuration according to embodiments of the invention, secure computer 120 is a standalone computer system, similar to a conventional desktop, laptop or pad computer. In such an example, host 102 is implemented by a SATA host port in communication with a host CPU (e.g. x86), a conventional operating system such as Windows and associated device driver software. In accordance with certain aspects of the invention, in this example, the operation and functionality of subsystem 104 is completely transparent to the host CPU and associated operating system and application software. Moreover, the operating experience of secure computer 120 by a user is identical to the experience of a conventional desktop, laptop or pad computer, albeit with the additional background backup and security functionality of the present invention. So while the application software that can run on the computer is virtually unrestricted, use of devices 110 is strictly controlled by subsystem 106 which enforces security policies as will be described in more detail below.

In these and other embodiments, subsystem 104 is preferably an embedded system. As such, it runs a designated software system furnished together with an embedded processor, and cannot be modified by the end-user of the computer under any circumstances. According to aspects of the present invention, subsystem 104 is responsible for performing security functions such as performing transparent snapshots and/or backups of data on SATA device 110.

An example architecture for implementing subsystem 104 together with a host CPU in a secure computer 120 is described in co-pending application Ser. No. 13/971,677, the contents of which are incorporated by reference herein. Those skilled in the art will understand how to implement the principles of the present invention in various configurations of secure computer 120 after being taught by the present disclosure.

SATA device 110 comprises a SATA standard interface included in internal or external storage devices such as disk drives, solid state drives, etc.

Although FIG. 1 shows only one SATA device 110 and SATA host 102, it should be appreciated that there can be several SATA devices and hosts in a single computer 120, either managed by respective subsystems 104 or the same subsystem 104. Moreover, although the present invention will be described in detail with respect to the SATA standard, those skilled in the art will be able to implement the invention with devices and communications according to similar standards such as eSATA, mSATA, etc. after being taught by the present disclosure. Still further, it should be appreciated that the present invention can be applied to each current or future version of SATA (e.g. SATA revisions 1.0, 2.0, 3.0, etc.).

Various aspects of the types of security functionality performed by secure SATA subsystem 104 that can be adapted for use in the present invention are described in more detail in co-pending application Ser. No. 13/971,582, the contents of which are incorporated herein by reference in their entirety.

FIG. 1 further shows a Remote Management system 106 coupled to secure subsystem 104 of secure computer 120 by a communication channel 108. FIG. 1 also shows the different message types that can be sent over a Communication Channel 108, specifically status messages 112 from secure subsystem 104 to remote management system 106, control messages 114 from remote management system 106 to secure subsystem 104 and data messages 116 from secure subsystem 104 to remote management system 106.

Although FIG. 1 shows remote management system 106 coupled to only one secure subsystem 104, it should be apparent that one or more additional secure subsystems 104 may be similarly coupled to remote management system 106. Moreover, the connection 108 to remote management system 106 is not necessary for all embodiments of the invention. For example, the snapshot and backup functionality in embodiments of the invention can be performed completely locally by secure subsystem 104.

Channel 108 can be implemented in various ways, possibly depending on the number and type of devices to be managed by system 106. Channel 108 can be a separate direct point-to-point link between system 106 and subsystem 104. In other embodiments, channel 108 can be implemented by a transmission medium that is shared between many subsystems 104. In these and other embodiments, the medium can be any combination of wired or wireless media, such as Ethernet or Wireless LAN. In these and other embodiments, channel 108 can be implemented by various types and/or combinations of public and private networks using proprietary protocols or conventional protocols such as UDP or TCP. In some embodiments, data sent over communication channel 108 is encrypted such as being sent over a secure VPN connection to improve security.

According to general aspects, in embodiments of the invention, remote management system 106 is responsible for managing policies that can include lists of allowed devices as well as whether and how often to perform disk snapshots and/or backups. The remote management system 106 can further include functionality for specifying where to back up data within system 106, particular snapshot creation algorithms to use (e.g. time-based, activity-based, storage size-based, user-based, a combination of any of these, etc.), etc. Based on these lists, and devices attached to interfaces of computer 120, remote management system 106 sends appropriate configuration information to subsystem 104 via channel 108.

Accordingly, control messages 114 sent from Remote Management System 106 to one or more Secure SATA Subsystems 104 contain different configuration commands and settings such as snapshot schedules to be described in more detail below. Status messages 112 sent from one or more Secure SATA Subsystems 104 to Remote Management System 106 contain different notifications and alerts. An example of status messages 112 includes notifications of attached devices 110, creation of a new snapshot, status of snapshots, user activity levels, etc. Data messages 116 sent from one or more Secure SATA Subsystems 104 to Remote Management System 106 contain data from secure devices such as hard drive snapshots.

Various aspects of a remote management system and/or security policies that can be adapted for use in the present invention are described in more detail in co-pending application Ser. No. 13/971,711, the contents of which are incorporated herein by reference in their entirety.

Figure 2:
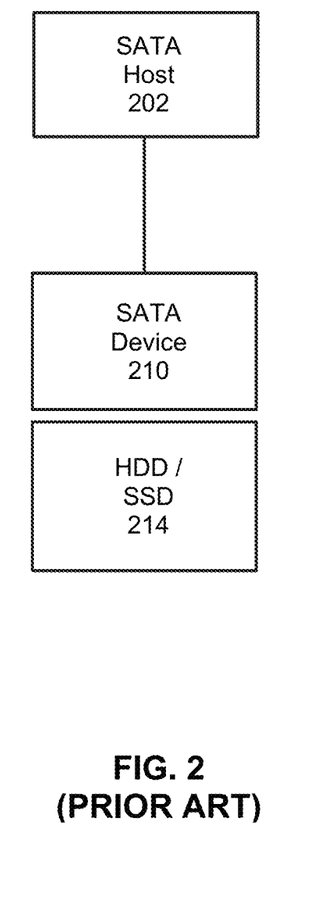
FIG. 2 is a block diagram illustrating existing SATA communications.

As mentioned previously, aspects of the invention include providing security functionality to otherwise unsecure SATA interfaces. FIG. 2 shows an existing SATA system. It consists of SATA Host 202 and SATA Device 210. As is known, SATA uses a point-to-point architecture. The physical connection between a SATA host and a SATA device is not shared among other hosts and devices. In a common implementation, PC systems have SATA controllers supporting SATA hosts 202 built into the motherboard, typically featuring two to eight ports. Additional ports can be installed through add-in SATA host adapters plugged into system bus slots (e.g. PCI). The data connection between a SATA host 202 and a SATA device 210 (integrated into a hard drive or solid state drive 214 in this example) is typically provided through a standard 7-conductor data cable having separate transmit and receive conductor pairs, with each using differential signaling. In the prior art system shown in FIG. 2, all the data exchanged between SATA Host and Device is unencrypted.

Figure 3:
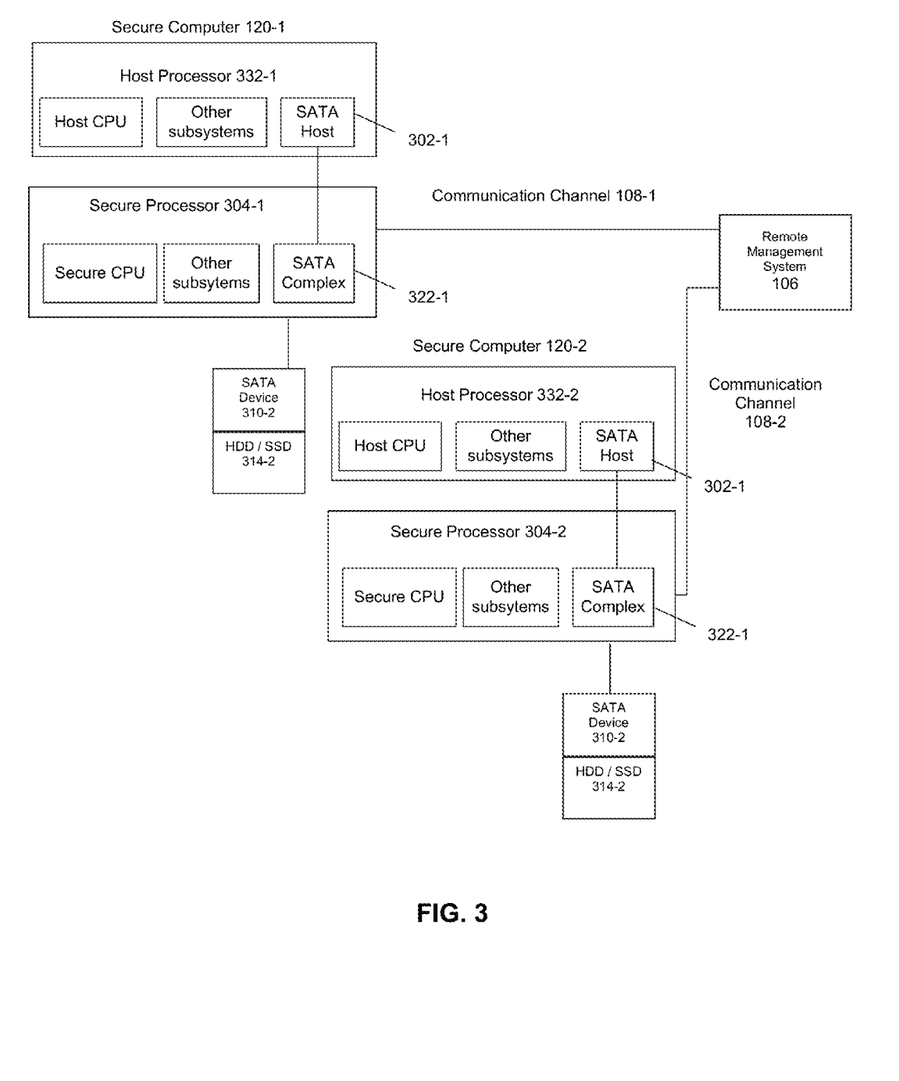
FIG. 3 is a block diagram illustrating an example management system for backing up and/or securing SATA data and communications according to embodiments of the invention.

FIG. 3 is a block diagram illustrating another example management system 300 according to embodiments of the invention. In this example, the system manages security of two secure computers 102-1 and 102-2 connected to Remote Management System 106 via respective communication channels 108-1 and 108-2.

As can be seen in comparison to FIG. 2, the topology of the system 300 is made secure by the inclusion of secure processor systems 304, remote management system 106 and communication channels 108.

As set forth above in connection with the more general example of FIG. 1, and as will be described in more detail below, embodiments of secure processor subsystem 304 are responsible for creating snapshots of data stored on HDD/SDD 314, perhaps at pre-defined discrete points in time defined by configurations provided by remote management system 106. Secure processor subsystem 304 can also perform other security functions in connection with SATA interfaces, such as transparent encryption/decryption, virus scans, etc., as described in more detail in co-pending application Ser. No. 13/971,732.

As shown in the example of FIG. 3, host processor systems 332 include a host CPU, a SATA host 302 and other subsystems. The other subsystems can include audio/video subsystems (e.g. cameras, webcams, microphones, graphics and audio processors, etc.), I/O subsystems (e.g. USB, Firewire, etc.) and networking subsystems (e.g. Ethernet). Aspects of securing these other subsystems are described in more detail in U.S. Pat. No. 9,076,003 and co-pending application Ser. Nos. 13/971,582, 13/971,604 and 13/971,692. Those skilled in the art will understand how the snapshot functionality of the present invention can be practiced along with certain or all of these other inventions after being taught by the present disclosure.

As further shown in the example of FIG. 3, secure processor systems 304 include a secure CPU, a SATA complex 322 and other subsystems corresponding to the other subsystems of host processor system 332. As shown, SATA complex 322 is disposed in the communication path between the SATA host 302 in host processor system 332 and SATA device 310 for performing the transparent snapshot functionality of the invention.

Communication Channel 108 is responsible for secure transmission of configurations and settings from remote management system 106 to secure processor systems 304, and status and command messages between systems 304 and management system 106. Communication channel 108 is typically implemented using Ethernet. In embodiments of the present invention, channel 108 is also primarily responsible for carrying disk drive snapshot and/or backup data. This snapshot/backup data can be encrypted and optionally compressed before being sent to management system 106.

Figure 4:
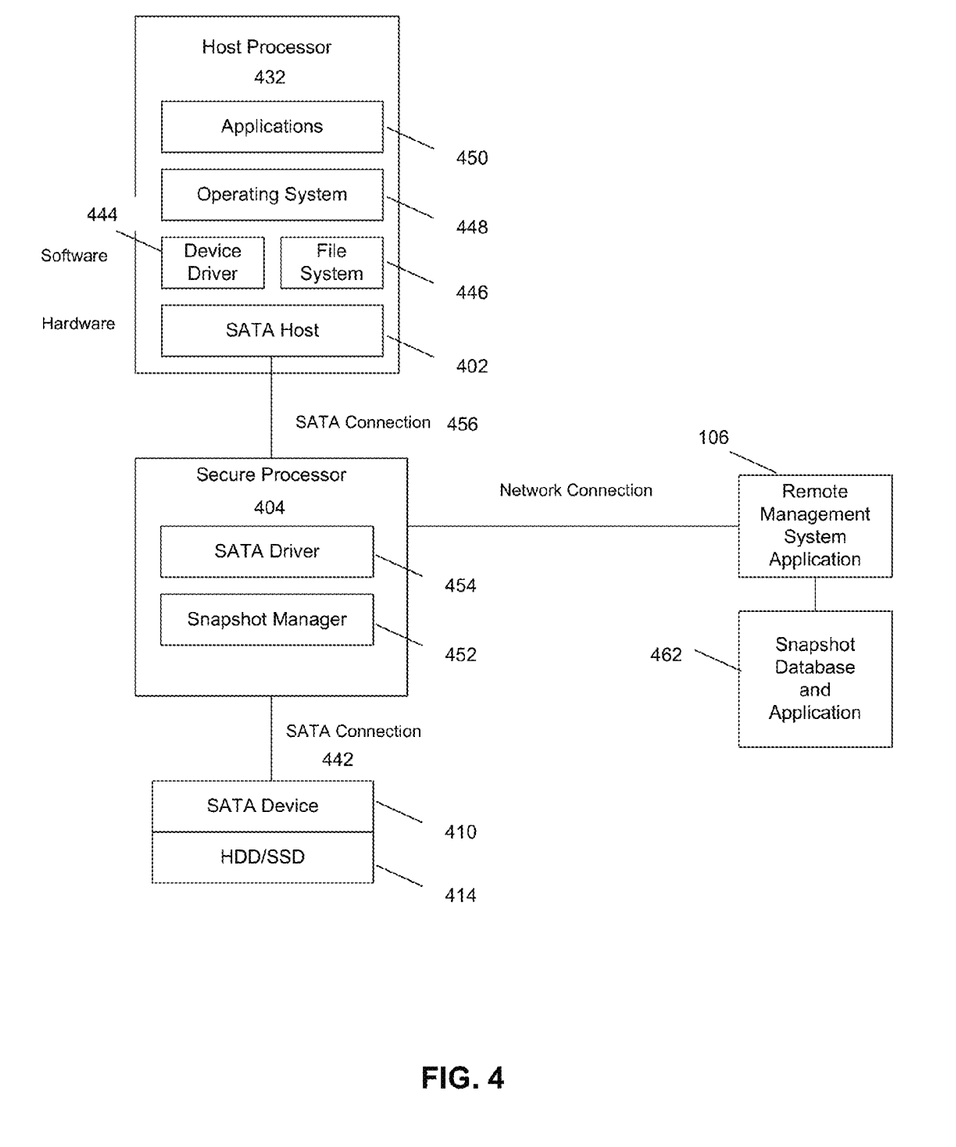
FIG. 4 is a block diagram illustrating how example secure SATA subsystems according to embodiments of the invention are included in the data flow of typical hardware and software layers.

FIG. 4 is another view of a system for transparently creating snapshots of SATA device contents according to embodiments of the invention, broken down into software and hardware layers in both host processor system 432 and secure processor system 404 involved in the data flow.

In this example, the hardware device associated with SATA device 410 is a physical storage device 414, such as a hard drive or SSD. SATA Device 410 is responsible for converting data carried by an industry-standard SATA protocol into a vendor-specific data format used by the physical Storage Device 414. SATA Device 410 is connected to the Secure processor system 404 via a connection 442 and 456 such as a SATA standard cable.

As shown, secure processor system 404 in this embodiment of the invention includes a snapshot manager 452. Manager 452 performs transparent snapshots and/or backups of the data passing between SATA Host 402 and Device 410. According to transparency aspects of the invention SATA driver 454 is shown to represent overall functionality of secure processor 404 for providing an otherwise normal connection between SATA host 402 and SATA device 410 via SATA connections 442 and 456.

As further shown in FIG. 4, in software layers above SATA host 402 are device driver 444 and file system 446. Examples of File Systems are FAT32, NTFS, or ext4. According to aspects of the invention, both SATA Device Driver 444 and File System 446 are unaware of the fact that the data is encrypted.

In software layers above device driver 444 and file system 446 is operating system 448. Examples of Operating Systems are Linux, Mac OS, Windows, Android, or iOS. Applications 450 are shown in software layers above operating system 448.

As further shown in FIG. 4, this example of remote management system 106 includes a snapshot database and application 462 that is responsible for processing received snapshot data and storing it in a Snapshot Database. Embodiments of application 462 are also responsible for instructing secure processor 404 if and how often to perform snapshots and/or if and when to send snapshot data to remote management system 106. In other embodiments, these configurations are pre-defined by secure processor 404.

It should be noted that embodiments of application 462 and secure processor 404 also have the capability to restore the contents of secure computer 120's HDD/SSD (to any given period of time) based on the cumulative snapshots sent over time as well as extract a single or group of files dating back to a given date (i.e. restoring a specific snapshot) using the snapshot management tables described in more detail below. This functionality is preferably exposed for control by a system administrator of system 106 and may also be granted to a given user of computer 120 (with the appropriate permissions).

Embodiments of secure processor 404 and manager 452 also implement a "Near/Far-line backup" strategy. In this strategy, recent snapshots are near-line archived (on the drive) and older snapshots are far-line archived over the network (on a backup server/NAS/SAN or even tape). Embodiments of secure processor 404 and manager 452 could also implement a larger drive (e.g. use of a "semi-virtual" drive that would provide more storage for less money). For example, a 1 TB drive in the secure computer 120 could be used to implement a ("semi-virtual") 2 TB drive, with the extra 1 TB on a (farther out) backup server. This would leverage smart address (LBA) translation algorithms. It should be noted that this is different from using address translation for implementing snapshots as mentioned above.

Additional or alternative embodiments of secure processor 404 and manager 452 also implement context-based storage. There are different types of documents (or data types) that are used and stored on a PC, for instance: Word docs, pictures, music, video, email, etc. Embodiments of secure processor 404 and manager 452 store on a remote backup server smaller items that are easy and quick to retrieve (e.g. small emails, word docs or pdf files) and/or items that are less-frequently used (e.g. compress and store-off email archives from outlook). This would be done in the background, by the secure processor 404, transparently to the host CPU. The secure processor 404 would need awareness of the types of files being stored by the host's operating system 448 and application 450 behavior. This could be done by profiling drive accesses to learn various operating system or application behavior.

As described in more detail below, embodiments of snapshot manager 452 are responsible for managing used and unused memory blocks in drive 414 for snapshots, including generating a new snapshot, and deleting an existing snapshot. In embodiments, the local drive can only store a limited number of snapshots, and so over time, when a new snapshot needs to be created, an older one (typically the oldest one on the drive) can be backed-up on the backup server 106 (over the network) using application 462 and then deleted to make room for the new snapshot.

Figure 5:
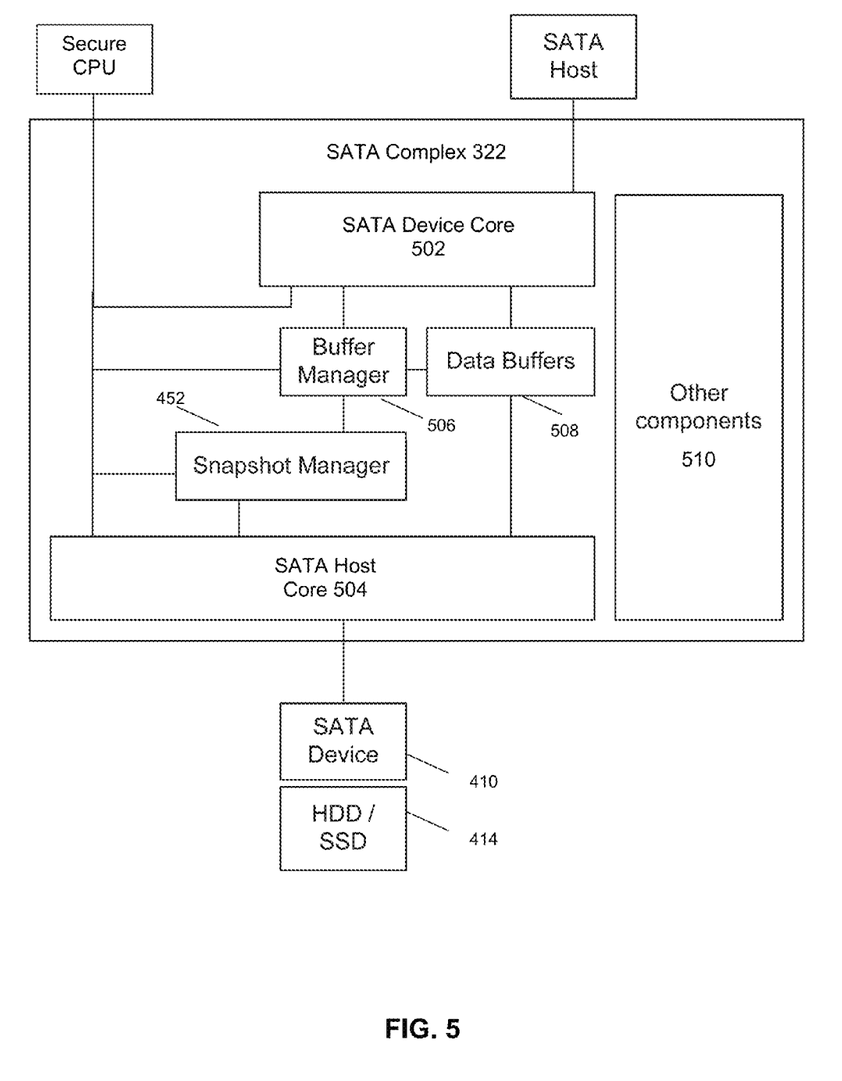
FIG. 5 is a top-level block diagram illustrating an example secure SATA complex that can implement the snapshot manager functionality shown in FIG. 4 in a secure computer according to embodiments of the invention.

FIG. 5 is a partial block diagram of an example SATA complex 322 according to embodiments of the invention. As shown, in addition to snapshot manager 452, it includes SATA device core 502, SATA host core 504, buffer manager 506, data buffers 508 and other components 510.

According to transparency aspects of the invention, SATA device core 502 and host core 504 operate as peer devices to corresponding SATA Host 402 and SATA Device 410. As such, from the protocol standpoint, they render the secure subsystem of the invention transparent to SATA host 402 and SATA device 410. According to aspects of the invention, cores 502 and 504 are standard full featured SATA cores. Those skilled in the art of SATA devices will understand how to implement SATA device core and host core 502, 504 after being taught by the present disclosure, as well as by existing and future SATA specifications.

Data buffers 508 (e.g. FIFOs) buffer data flowing to/from SATA host 402 and device 410. Buffer manager 506 performs overall buffer control functions, such as keeping track of available space, managing buffer reads and writes from different sources, etc.

Other components 510 include those that implement additional security functionality such as transparent encryption/decryption of SATA communications, virus scanning, etc., as described in more detail in co-pending application Ser. No. 13/971,732.

It should be noted that computer 120 and/or SATA complex 322 can include fewer components than those shown in FIG. 5, for example depending on the particular combination of SATA security functionality that is supported in a particular embodiment of secure computer 120. It should be still further noted that, although shown separately for ease of illustration, certain or all of the components of SATA complex 322 and secure processor system 404 can be implemented together in any combination of hardware, software or firmware. In one example implementation, they are all provided in a single ASIC or SOC.

In example embodiments of the invention to be described in more detail below, snapshot manager 452 utilizes an address remapping scheme where the addresses to locations in HDD/SSD 414 for incoming SATA data transfer commands are remapped to alternative addresses. By changing the remapping, multiple snapshots and/or backups of data stored or used by the host processor can be created and stored in HDD/SSD 414, completely transparently to the host processor. Meanwhile, by keeping tables completely describing the remapping, snapshot manager 452 ensures that the host processor is able to access the most currently stored data, while maintaining previous snapshots in HDD/SSD 414. The snapshots can also be accessed by the secure processor system and sent to remote management system 106, either according to a specified schedule or on command from the remote management system 106.

Figure 6:
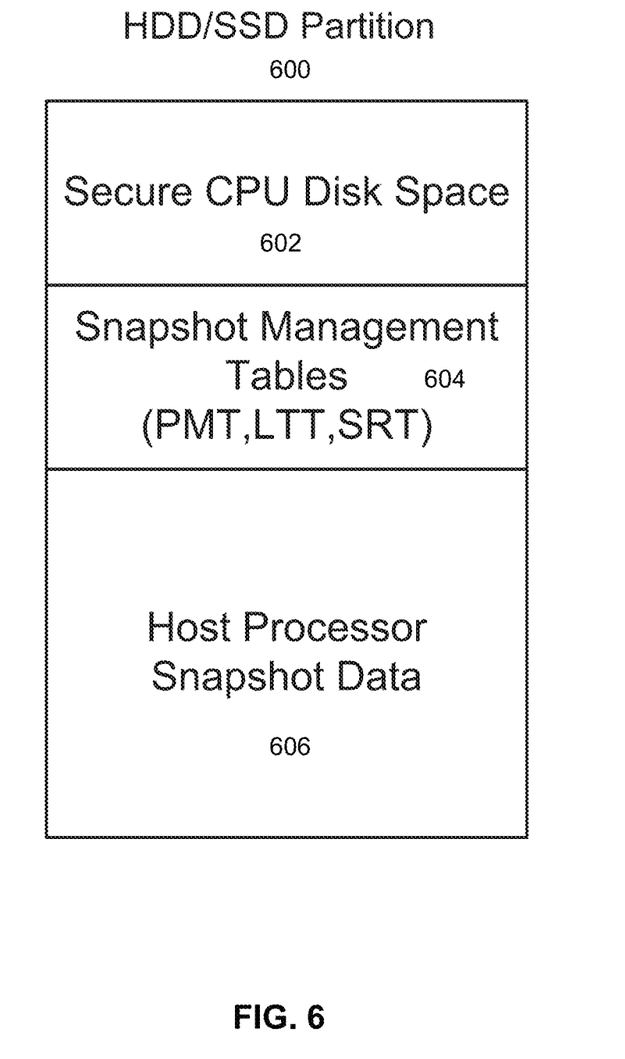
FIG. 6 is a block diagram illustrating an example HDD/SSD partition according to embodiments of the invention.

FIG. 6 depicts an example partition of HDD/SSD 414 maintained by snapshot manager 452 for implementing snapshots according to embodiments of the invention.

As shown, partition 600 includes space 602 for storing data used by the secure CPU, snapshot management tables 604 and space 606 for host processor data, which is stored as two or more snapshots defined by tables 604 and managed by snapshot manager 452. It should be apparent that space 606 is the actual space that the host CPU reads and writes to drive 414. According to aspects of the invention, space 606 is a subset of the total physically available drive space. For example, if the secure computer 120 has a 2 TB drive, the host CPU may only "see" 1 TB of usable data space which is stored using snapshots in area 606, with the rest occupied by spaces 602 and 604. It should be further noted that, although spaces 602, 604 and 606 are all shown as contiguous spaces in FIG. 6 for ease of illustration, this is not necessary. Rather, some or all of spaces 602, 604 and 606 may be physically fragmented so as to be located in various and intermingled physical locations in HDD/SSD 414.

As mentioned above, the mapping of the alternative addresses is kept in tables. Snapshot manager 452 is responsible for saving the mapping tables to space 604 in HDD/SSD 414. During normal operations, the mapping tables are at least partially available to snapshot manager 452 in locally accessible memory. In embodiments, the translation tables are very large and thus the full tables need to be stored on the drive 414. Meanwhile, in order to speed up drive access, a sub-set of the tables are "cached" on-chip, within the SATA complex 322 (and/or the secure processor 304's DDR). From time-to-time, the cache needs to be written out (flushed) to the drive. If the address of the currently translated command is not in cache, then a new section of the table on the drive, that includes the desired translated address, is read to cache. It may be necessary to first flush a section of the cache to drive, to make room for the new section. There are multiple algorithms for determining which section to flush, for example, last recently used (LRU), etc., that are familiar to those skilled in the art and can be used in embodiments of the invention.

For read commands issued by the host processor system and intercepted by SATA device core 502, snapshot manager 452 uses the address received with the command to look up the translated address and forwards the translated address and read command to SATA host core 504. As needed, the incoming command may be broken up into multiple commands to the drive 414. For write commands intercepted by SATA device core 502, snapshot manager 452 retrieves an unused address from a stack of addresses to use as a remapped drive address for the write data and forwards the remapped address and write command to SATA host core 504. If the host processor 432 is writing to the same (logical) location on the drive a second or more times (i.e. for a given, active, snapshot) then the data is translated to the same location as the last write (no need to find an unused address). The stack of unused addresses is maintained by snapshot manager 452. When the secure processor determines that a new snapshot of data should be initiated, snapshot manager 452 will pause processing of commands from the host processor system and save the current translation tables in space 604. This may involve backing up the oldest snapshot to the backup server on system 106, deleting it and create a new snapshot, as set forth above. The translation table 604 caches are flushed to the drive periodically to maintain coherency. Coherent tables from the drive are also sent to the backup server.

Figure 7:
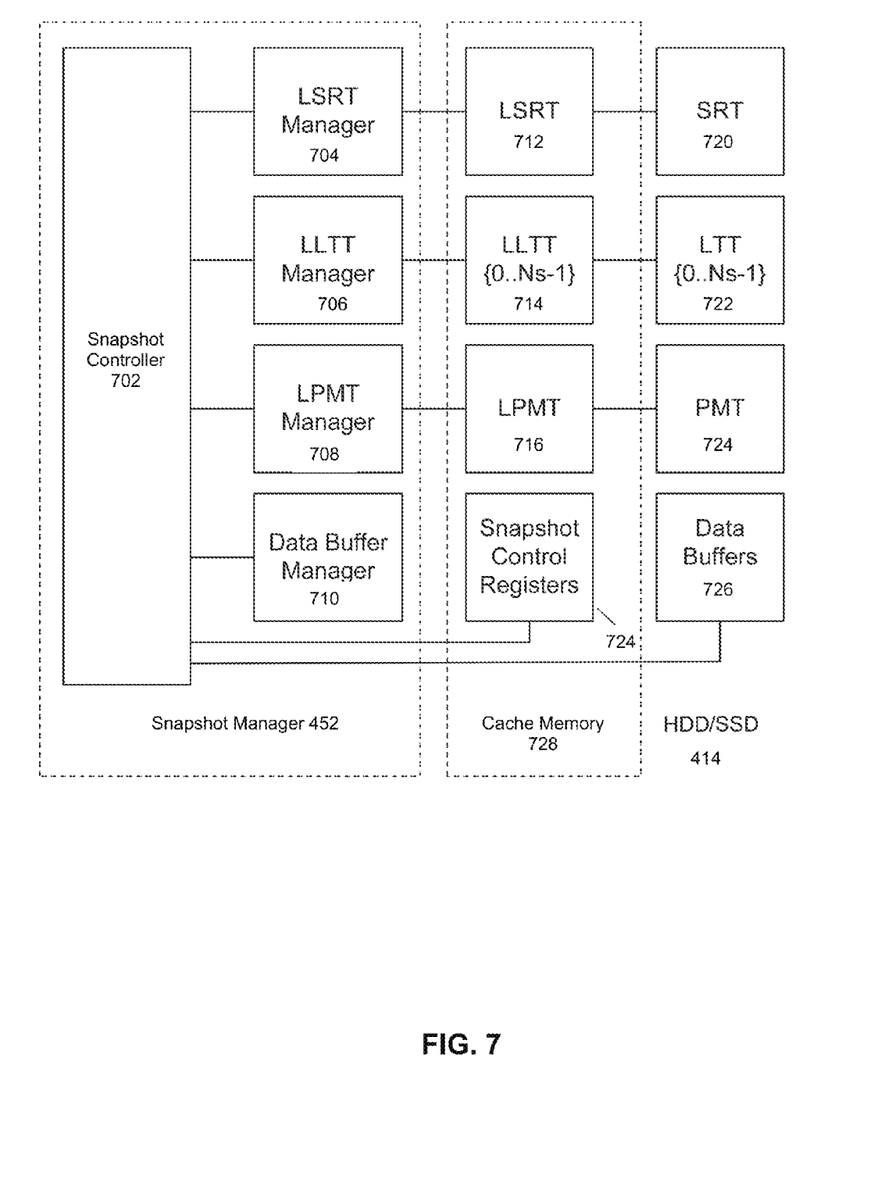
FIG. 7 is a block diagram illustrating an example configuration of a snapshot manager and associated mapping tables that can implement snapshot manager functionality such as that shown in FIG. 4.

FIG. 7 is a block diagram of an example Snapshot Manager 452 according to embodiments of the invention.

As shown in the example of FIG. 7, snapshot manager 452 maintains three tables in support of its snapshot functionality: Snapshot Record Table (SRT) 720, LBA Translation Table (LTT) 722 and Page Map Table (PMT) 724. As is known, LBA stands for Logical Block Address, which is the basic addressing unit defined in SATA protocol. In connection with LTT 722, Ns denotes a maximum number of snapshots, for example eight. The system can be configured to support any number of snapshots up to Ns. Snapshot 0 denotes the base snapshot. In embodiments, the above tables are large and stored on HDD/SSD 414. For example, those table can reach 100 MByte or more.

Since SATA HDD/SSD accesses incur high latency, LTT, SRT, and LTT tables have cached copies in a local cache memory 728 accessible to snapshot manager. The actual implementation of the local cache memory depends on the chip architecture; it can be either on-chip memory or off-chip RAM. As shown in FIG. 7, the cached tables are LSRT 712, LLTT 714 and LPMT 716, where the first "L" stands for "Local". Respective managers 704, 706 and 708 for cached tables 712, 714 and 716 perform the following operations: initializing the cache, adding a new entry to a cache, reading an existing entry from the cache, and replacing an existing entry with a new entry Page is the smallest data unit used by snapshot manager 452 during address remapping. The remapping is performed from the actual LBA to an alternative LBA. Typically, a page size is several sectors (e.g. 512 bytes) of the physical drive, for example eight.

The mapping of pages is kept in LTT 720. Each snapshot corresponds to a single LTT (e.g. snapshot 0 to Ns−1). Manager 706 loads subset sections of the full LTT 722 from the drive 414 to cache 728 as needed, when SATA commands are processed by the snapshot manager. In embodiments, there are eight LLTTs 714 loaded in cache memory 728, and fully accessible by manager 706 and controller 702.

Each LTT 722 contains only remapped pages that have changed since the last snapshot. SRT 720 is used to indicate which pages are valid for any of the LTTs 722. Manager 704 loads portions of SRT 720 from drive 414 to cache 728 so they are accessible by managers 702 and 704. In embodiments, there are eight LSRTs 714 loaded into cache memory 728.

PMT 724 is used for remapping incoming pages into available physical pages during write transactions. Manager 708 loads portions of PMT 724 from drive 414 to cache memory 728 so they are accessible by manager 708 and controller 702.

In general operation of embodiments of manager 452, LTT Manager 706 accepts LBA requests associated with read and write commands from SATA device core 502 via snapshot controller 702 and performs address translation. LTT manager 706 queries the LSRT 712 on write operations to see if the current command has already been translated for the current snapshot. If not, LSRT 712 is updated and manager 706 instructs manager 708 to update LPMT 716.

LTT's 722 are the translation tables that map all host processor system command LBA's to drive 414 LBA's. For each snapshot that has been initiated, there is a unique LTT 0 to LTT Ns. There is a base snapshot LTT 0 that always defines the oldest version of data on the drive. The starting LBA and size for the base snapshot LTT is programmed to the snapshot registers 724 by the snapshot controller 702. Each subsequent snapshot LTT is saved at the next sequential LBA to form a large block of data on the drive that contains the LTT's for all possible snapshots. Snapshot controller 702 is responsible for programming the registers 724 that define the location of LTTs 722 on the drive 414.

Data buffer manager 710 and data buffers 726 are can be similar to those components described above in connection with FIG. 5. They manage all the transfers of the SATA command's data to/from the drive. The addressing is controlled by the snapshot's address (LBA) translation logic.

Figure 8:
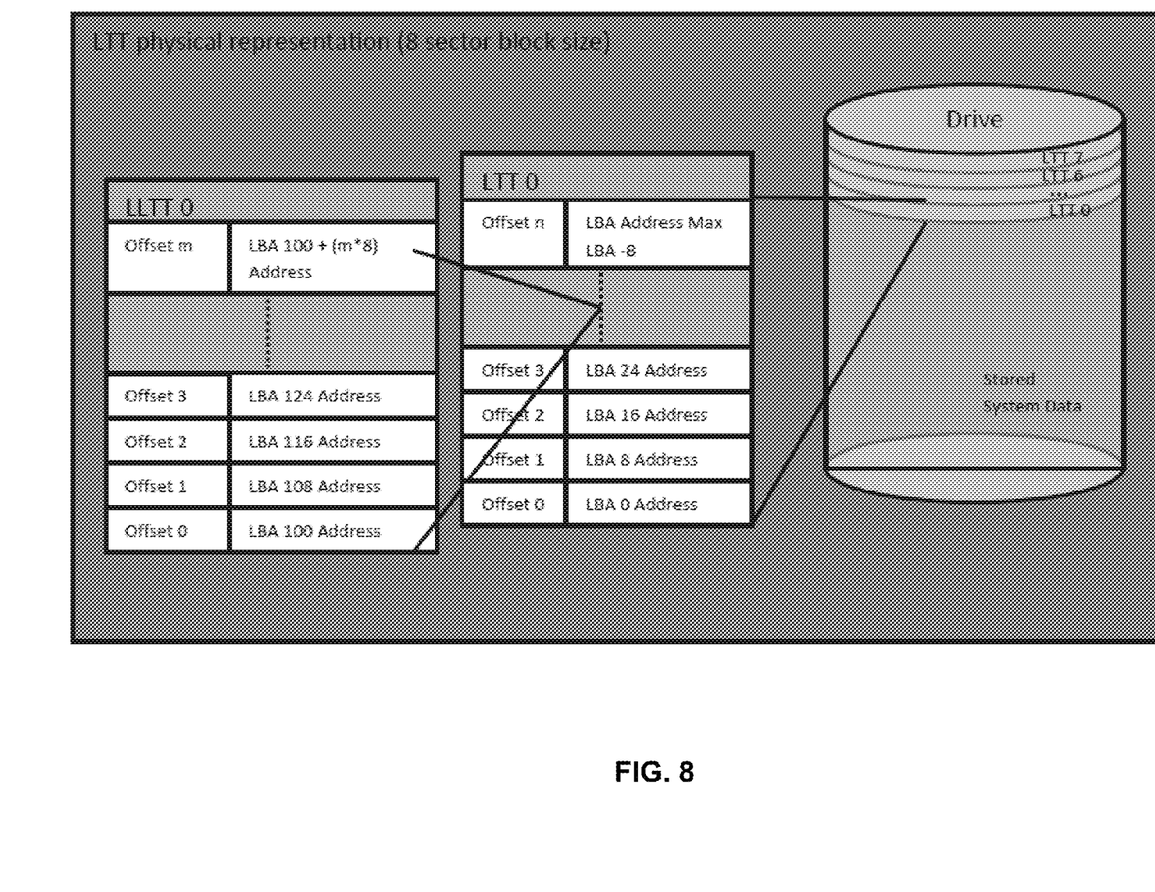
FIG. 8 is a block diagram illustrating an example LBA translation table used by a snapshot manager according to embodiments of the invention.

FIG. 8 shows an example implementation of LTTs 722 according to embodiments of the invention.

The number n of entries in each LTT is dependent on the virtual size of the drive as well as the granularity of the storage pages. Embodiments of the invention support one sector page size and eight sector page size. With 32 bits per entry in the LTT, the maximum physical drive support with one sector page size is 2 TB. The maximum physical drive size supported for 8 sector page size is 16 TB.

As mentioned above, manager 706 loads portions of LTTs 722 to local cache memory. In the example shown in FIG. 8, m entries from LTT 0 starting at LBA 100 are loaded into LLTT 0. Snapshot control registers 718 define the LLTT's 714, and these registers define the LBA's referenced in each LLTT. The LLTT's 714 are typically loaded by the snapshot controller 702 at the request of LTT manager 706. The LLTTs may also be loaded at the request of the secure CPU. The LLTT's reside in an addressable memory block that is accessible via the secure processor 404's internal fabric (e.g. an AXI fabric) by the snapshot manager. Only those LBA's that have been written to while the current snapshot is active will be updated in LTTs 722. Any LBA's that have not been updated in the current snapshot LTT may be defined in earlier snapshot LTT's 722. SRT 720 defines those LBA's that have been updated for each snapshot.

The LLTTs 714 will occasionally be saved to the drive LTTs 722 by the snapshot controller 702. The snapshot registers 718 define the current snapshot, and snapshot controller 702 uses the current snapshot information to save the LLTTs 714 to the proper area of the LTTs 722.

When the secure processor determines to discard a snapshot, embodiments of snapshot manager 424 effectively merges the deleted LTT with the base LTT. The secure processor via snapshot manager 424 scans the SRT 720 to determine which LBA's were updated with the discarded snapshot. The translated page addresses for those updated LBA's must be copied to the base snapshot LTT by secure processor 404. The replaced page address in the base snapshot LTT must be marked as available in the PMT 724 so that it may be used by LTT Manager 706 for new write commands. Once all required entries have been transferred to the base LTT, the secure processor 404 writes the snapshot control registers 718 to disable the discarded snapshot. Finally, the secure processor 404 causes the SRT 720 entries for the discarded snapshot to be cleared.

Figure 9:
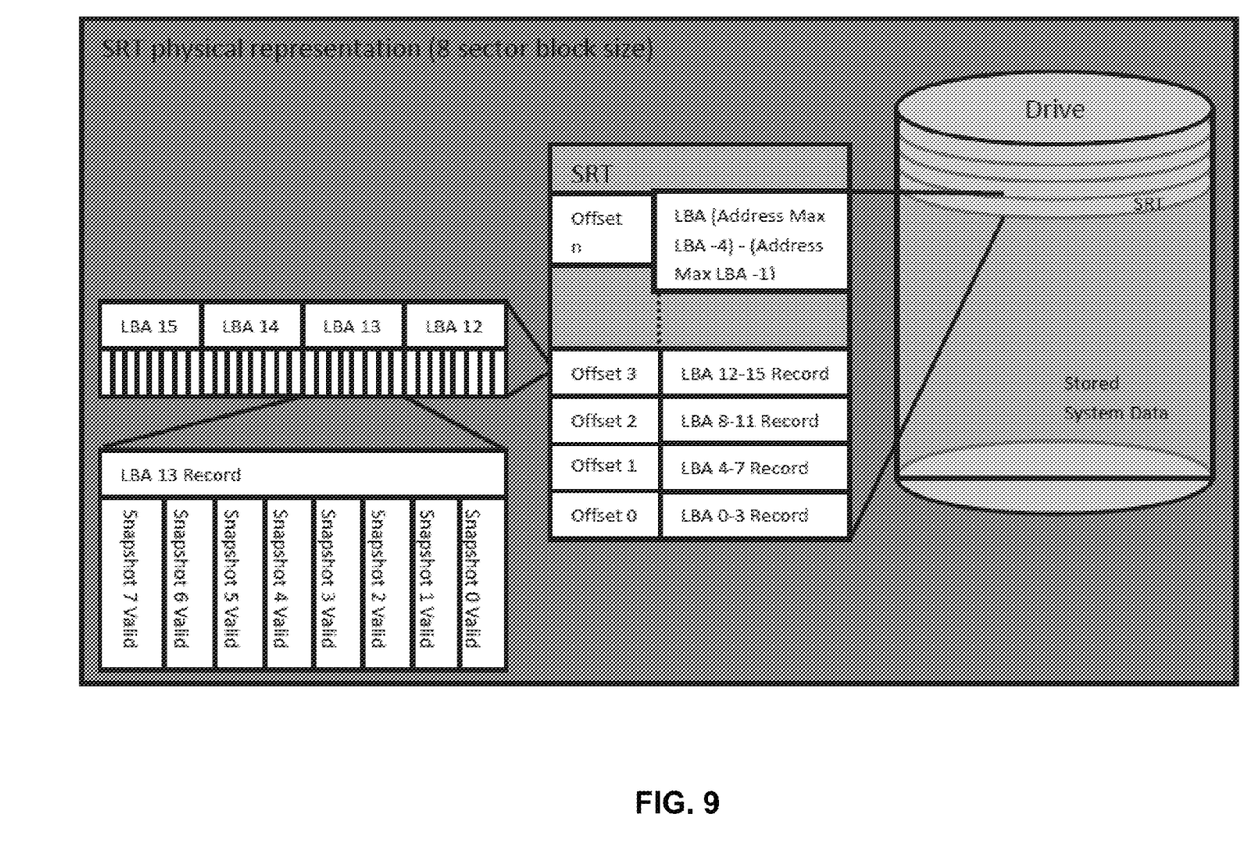
FIG. 9 is a block diagram illustrating an example snapshot record table used by a snapshot manager according to embodiments of the invention.

FIG. 9 shows an example implementation of SRT 720 according to embodiments of the invention.

As shown in FIG. 9, SRT 720 includes an entry for each LBA in drive 414. In the example shown, there are 32 bit entries at each offset in SRT 720, with each entry having eight bits for each LBA. The eight bits correspond to the maximum number of snapshots in this example.

SRT 720 identifies which LBA's have changed since the previous snapshot. Embodiments of SRT 720 support up to eight snapshots. Snapshot 0 is considered the base snapshot, and may not be discarded. As write commands are sent to the drive, only the translated address for the written LBA's are updated in the current snapshot LTT. The SRT has one bit that corresponds to each entry in all the LTT's. This means there is one bit per LTT entry and per snapshot. When an entry is updated in a LTT, the corresponding bit in the SRT that maps that update is set to a '1' to record the change. For example 0x00001101 denotes snapshot numbers 3, 2 and 0 for this LBA. LTT Manager 706 causes the appropriate bits in the LSRT 712 to be set as write commands are executed.

Clearing of bits in SRT 720 is left to the secure processor. The secure processor will clear bits in the SRT when a snapshot is discarded. All bits in the SRT corresponding to the discarded snapshot should be cleared once all other tasks of merging the discarded snapshot with a base snapshot are complete.

In the example of FIG. 9, there is one bit in SRT 720 for every 32 bit entry in the LTT. In embodiments supporting eight snapshots, and therefore eight snapshot LTT's, there is one byte in SRT 720 for each page in the virtual drive. For an SRT size of 2,147,483,648 bytes, a 1 TB virtual drive with one sector pages sizes is supported, or an 8 TB virtual drive with eight sector pages is supported.

Figure 10:
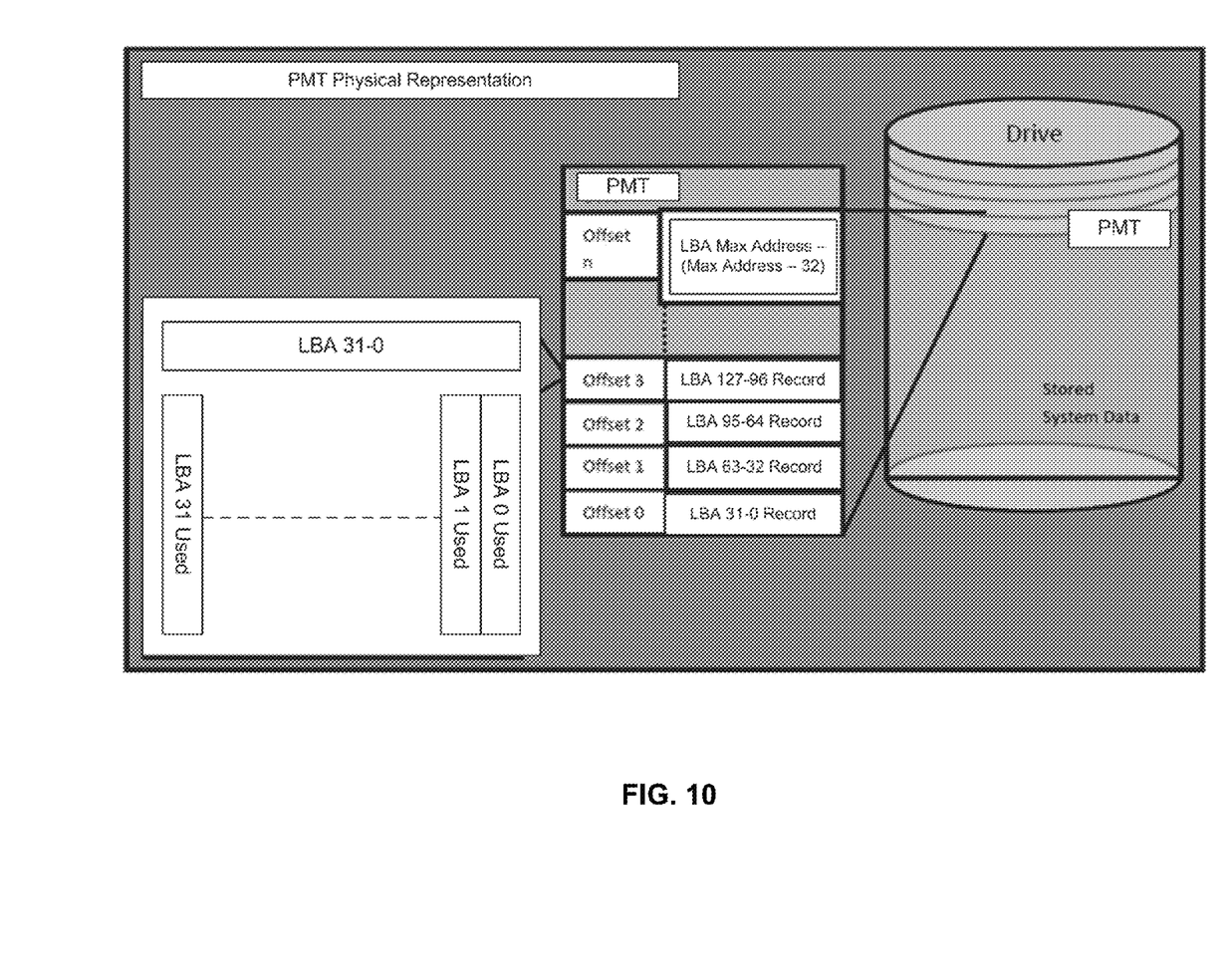
FIG. 10 is a block diagram illustrating an example page map table used by a snapshot manager according to embodiments of the invention.

FIG. 10 shows an example implementation of PMT 724 according to embodiments of the invention.

As shown in FIG. 10, PMT 724 includes 32-bit records at each offset, with each bit corresponding to a LBA in drive 414.

PMT 724 is a table that defines which page addresses have been used to remap the drive 414 LBA's. There is one bit in PMT 724 for each page of the drive. When a bit is set in the PMT, the corresponding page address is marked as used (set to a '1'). When a bit is cleared in the PMT, the corresponding page address is marked as free (set to a '0'). Manager 704 and/or manager 708 in secure processor 404 loads a subset of the PMT into the local cache memory 728. As write commands are executed by the snapshot manager, the snapshot controller 702 scans the locally loaded LPMT 716 to find the next available page. When the next available page address is assigned to an LBA, the corresponding bit in LPMT 716 is automatically set by snapshot controller 702. Once the snapshot has scanned and used all available page addresses as defined in the local PMT, the snapshot controller 702 will interrupt the secure processor. The secure processor is then responsible for causing a new subset of the PMT 724 to be loaded in local memory 728.

The bits in the PMT 724 can only be cleared by the secure processor. The secure processor is responsible for causing the base snapshot LTT to be merged with the discarded snapshot LTT. In embodiments, the discarded snapshot is the oldest existing snapshot aside from the base snapshot. As LTT entries are copied from the discarded snapshot LTT to the base snapshot LTT, the replaced entries of the base LTT are freed up, and must be cleared in the corresponding PMT entries so that the freed page addresses may be used for future write commands.

The size of the PMT depends on the block size. For a block size of 1 sector, PMT table is 32 Mbytes to cover physical drive size of 512 GByte. For block size of 8 sectors, a 4 MByte PMT covers 4 TByte.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A computer system, comprising:
a mass storage device;
a host processor executing an operating system and applications that create and use data stored on the mass storage device;
a snapshot manager that manages space on the mass storage device for storing one or both of snapshots and backup copies of the data, wherein the snapshot manager operates independently from and transparently to the host processor, and wherein the host processor cannot independently access the space managed by the snapshot manager; and
a secure complex including:
the snapshot manager;
a storage device core for communicating initial read and write commands with a storage device host executed by the host processor, the initial read and write commands corresponding to the data created and used by the operating system and applications and stored on the mass storage device; and
a storage device host core for communicating translated read and write commands with the mass storage device, the translated read and write commands corresponding to the initial read and write commands for the data created and used by the operating system and applications.

2. The computer system according to claim 1, wherein the snapshot manager is part of a secure serial AT Attachment (SATA) complex.

3. The computer system according to claim 2, wherein the SATA complex supports SATA operating at 1.5, 3.0 and 6.0 Gbs speeds.

4. The computer system according to claim 1, wherein the snapshot manager communicates with a remote management system via a network to further manage the space.

5. The computer system according to claim 4, wherein the snapshot manager sends certain of the data to the remote management system via the network.

6. The computer system according to claim 5, wherein the certain data comprises an oldest one of a plurality of snapshots.

7. The computer system according to claim 5, wherein the certain data comprises a least recently used one of a plurality of snapshots.

8. The computer system according to claim 5, wherein the snapshot manager deletes the certain data after sending it the certain data to the remote management system.

9. The computer system according to claim 1, further comprising a plurality of snapshot management tables used by the snapshot manager to identify, manage and access a plurality of different snapshots of the data created and used by the host processor.

10. The computer system according to claim 9, wherein the plurality of snapshot management tables includes a logical block address (LBA) translation table for each of the plurality of different snapshots.

11. The computer system according to claim 9, wherein the plurality of snapshot management tables includes a snapshot record table that includes one entry per partition block, indicating in which snapshots that that block was written.

12. The computer system according to claim 9, wherein the plurality of snapshot management tables includes a page map table indicating which addresses are free for translation.

13. The computer system according to claim 9, wherein the plurality of snapshots include a base snapshot that keeps all of the data up to the last saved snapshot and a given number of local snapshots to capture the most recent snapshots.

14. The computer system according to claim 9, wherein the plurality of snapshot management tables are maintained in a separate partition on the mass storage device.

15. The computer system according to claim 1, further comprising a motherboard to which the host processor and secure complex are commonly attached.

16. The computer system according to claim 1, wherein the snapshot manages the space on the mass storage device to cause it to contain:
a first partition that stores snapshot management tables that the snapshot manager exclusively uses to manage the storage of the one or both of the snapshots and backup copies of the data; and
a second partition separate from the first partition that stores a plurality of snapshots of the data that is created and used by the operating system and applications executed by the host processor,
wherein the host processor cannot access the second partition without communicating the initial read and write commands with the secure complex.

17. A method of creating snapshots of data stored on a mass storage device by a host processor of a computer system, comprising:
managing space on the mass storage device for storing the snapshots; and
creating snapshots of the data and storing the snapshots in the managed space on the mass storage device,
wherein the managing, creating and storing is performed independently from and transparently to the host processor, and wherein the host processor cannot independently access the managed space for the snapshots, and wherein the host processor executes an operating system and applications that create and use the data that is stored on the mass storage device, the method further comprising:
communicating initial read and write commands with a storage device host executed by the host processor, the initial read and write commands corresponding to the data created and used by the operating system and applications and stored on the mass storage device; and
communicating translated read and write commands with the mass storage device, the translated read and write commands corresponding to the initial read and write commands for the data created and used by the operating system and applications.

18. The method according to claim 17, wherein the managing, creating and storing does not cause the host processor's access to the mass storage device to violate any mass storage device specification requirements.

19. The method according to claim 18, wherein the mass storage device is a serial AT Attachment (SATA) device, and the specification requirements include one or more of communication latency, data integrity, and data rate.

20. The method according to claim 17, further comprising receiving a snapshot configuration from a remote management system.

21. The method according to claim 20, wherein the snapshot configuration includes one or more of frequency, schedule, snapshot size, and read/write activity.

22. The method according to claim 20, further including allowing an administrator associated with the remote management system to manually schedule the snapshots.

23. The method according to claim 17, further comprising sending certain ones of the snapshots to a remote management system via a network.

24. The method according to claim 23, wherein a frequency of sending the certain snapshots depends on network conditions.

25. The method according to claim 24, wherein the network conditions include available bandwidth, and wherein snapshots are sent more frequently when available bandwidth is higher.

26. The method according to claim 17, further comprising recovering snapshot data corresponding to a specified point in time.

27. The method according to claim 26, wherein recovering includes retrieving the snapshot data from a remote backup server.

28. The method according to claim 17, further comprising maintaining a plurality of snapshot management tables to identify, manage and access a plurality of different snapshots of the data created and used by the host processor.

29. The method according to claim 28, wherein the plurality of snapshot management tables includes a logical block address (LBA) translation table for each of the plurality of different snapshots.

30. The method according to claim 28, wherein the plurality of snapshot management tables includes a snapshot record table that includes one entry per partition block, indicating in which snapshots that that block was written.

31. The method according to claim 28, wherein the plurality of snapshot management tables includes a page map table indicating which addresses are free for translation.

32. The method according to claim 28, wherein maintaining includes storing the plurality of snapshot management tables in a separate partition on the mass storage device.

33. The method according to claim 32, wherein maintaining includes caching the plurality of snapshot management tables in a local memory.

34. The method according to claim 33, wherein maintaining includes flushing the tables back to the mass storage device.

35. The method according to claim 34, wherein flushing is performed periodically or prior to a system shut-down.

36. The method according to claim 17, wherein managing the space includes translating block read/write drive addresses specified by the host processor for accessing the data.

37. The method according to claim 36, wherein translating is performed to maintain a plurality of separate snapshots of the data on the mass storage device.

38. A computer system comprising:
a mass storage device;
a host processor executing an operating system and applications that create and use data stored on the mass storage device; and
a snapshot manager that manages space on the mass storage device for storing one or both of snapshots and backup copies of the data, wherein the snapshot manager operates independently from and transparently to the host processor, and wherein the host processor cannot independently access the space managed by the snapshot manager, wherein the snapshot manages the space on the mass storage device to cause it to contain:

a first partition that stores snapshot management tables that the snapshot manager exclusively uses to manage the storage of the one or both of the snapshots and backup copies of the data; and a second partition separate from the first partition that stores a plurality of snapshots of the data that is created and used by the operating system and applications executed by the host processor, wherein the host processor cannot independently access the second partition.

\* \* \* \* \*